(12) United States Patent
Bhandari

(10) Patent No.: US 6,307,695 B1
(45) Date of Patent: Oct. 23, 2001

(54) MAGNETIC DISK WRITE CHANNEL WITH DAMPING NETWORK

(75) Inventor: Sanjay Manohar Bhandari, Santa Clara, CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/268,258

(22) Filed: Mar. 15, 1999

(51) Int. Cl.$^7$ ............................ G11B 5/09; G11B 5/02
(52) U.S. Cl. ........................ 360/46; 360/68; 327/110
(58) Field of Search ..................... 360/46, 68; 327/110

(56) References Cited

U.S. PATENT DOCUMENTS 5,434,717 * 7/1995 Yoshinaga et al. ................. 360/46
5,668,676 * 9/1997 Voorman et al. ................... 360/66
5,726,821 * 3/1998 Cloke et al. ....................... 360/67

* cited by examiner

Primary Examiner—Andrew L. Sniezek
Assistant Examiner—Regina Y. Neal
(74) Attorney, Agent, or Firm—Edward W. Goodman

(57) ABSTRACT

A device for writing information to a magnetic medium includes an inductive head and a write amplifier coupled to the inductive head. The write amplifier receives an information signal, and amplifies the signal to provide a current through the inductive head to generate a flux at the inductive head which flux writes a bit of the information on the magnetic medium. The current for each bit of information is characterized by a rising portion, a peak portion, and a settling portion. A damping network is coupled to the inductive head, and couples a low impedance path to the head and the write amplifier, after the current reaches the peak portion, to divert current from the head to reduce a duration of the settling portion of the current. The write amplifier and damping network are embodied together in an integrated circuit, and are programmable via a serial interface.

8 Claims, 3 Drawing Sheets

MAGNETIC DISK WRITE CHANNEL WITH DAMPING NETWORK

BACKGROUND OF THE INVENTION

1. Field of the Invention

The invention relates generally to devices which record information on a magnetic medium. More particularly, the invention concerns an improvement which increases the data rate of such devices.

2. Description of the Prior Art

Magnetic recording devices are used to write information to a magnetic medium either in analog or digital form. The magnetic medium is typically a tape, such as used in the well-known compact cassette, or known high density drives for computers which are used for backup purposes. Another common form is a disk, such as a floppy disk or a hard disk for storing programs and data in a computer.

The write channel for a magnetic recording device includes a thin film inductive head (referred to herein as "within film head", "TFH", or simply "inductive head") in close proximity with the magnetic medium. A write amplifier drives a current through the head to generate a flux which very locally alters the orientation of the magnetic material, thereby writing information on the magnetic medium. The write amplifier is coupled to circuitry which receives the information to be recorded and processes the information in a form suitable for the write amplifier and according to a selected data format.

When information is written in digital form, such as for computer data storage or digital recording of music, a current is driven through the inductive head in one direction to write a binary "0" and in the opposite direction to write a "1". When the medium is read by a suitable head, such as a magneto-resistive head, the portions recorded with a binary "0" will induce a current in the head in the one direction and portions recorded with a binary "1" will induce a current in the opposite direction, which is then decoded.

The continuing goal of those in the art is to increase the recording densities and speed (data rate) of recording to a magnetic medium. Improving the recording density allows more information to be written in a given space of the medium. Improving the recording speed is important for allowing the huge amounts of information required by today's multimedia applications to be recorded in time periods acceptable to the user. Data rates on the order of 500–600 Mb/s are proposed for near term hard disk drives for computers.

SUMMARY OF THE INVENTION

Accordingly, there is a need for a method and apparatus which will facilitate faster recording speeds in magnetic recording devices.

Generally speaking, according to one aspect of the invention, a device for writing information to a magnetic medium includes an inductive head and a write amplifier coupled to the inductive head. The write amplifier receives an information signal, and amplifies the signal to provide a current through the inductive head to generate a flux at the inductive head for writing a bit of the information on the magnetic medium. The current for each bit of information is characterized by a rising portion, a peak portion, and a settling portion. A damping network is coupled to the inductive head, the damping network coupling a low impedance path to the head and the write amplifier, after the current reaches the peak portion, to divert current from the head thereby reducing a duration of the settling portion of the current.

The invention is based on the recognition that in order for data to be written at higher data rates, the current waveform in the inductive head must have faster rise/fall times. This is typically achieved by creating large overshoots of the write current. The invention is based on the further recognition that such large overshoots create longer settling times, which adversely affect the data rate. Large settling times create Inter Symbol Interference (ISI) in the data written to the magnetic medium, as the transition to the next bit of information occurs before the write current from the previous transition has completely settled. By coupling a low impedance discharge path to the head, the settling time is shortened as current is diverted from the head. Moreover, since the low impedance path is not coupled to the head until the peak portion of the current waveform is reached, the fast rise/fall time of the current created by a large current overshoot is not adversely affected. Thus, the invention shortens the settling time, while allowing very fast rise/fall times, thereby permitting high data rates during recording.

According to one aspect of the invention, the damping network senses a transition from the peak portion to the settling portion of the current. The damping network senses this transition by differentiating a voltage signal across the head.

According to another aspect of the invention, the inductive head includes first and second terminals and the damping network includes a high impedance branch coupled to the first terminal, and a low impedance branch coupled to the second terminal, the low impedance branch having a substantially lower impedance than the high impedance branch. A switch, coupled to the low impedance branch, is controlled by the damping network to divert the current through the low impedance branch.

In a favorable embodiment, the high impedance branch includes an RC network for differentiating the voltage across the head. The RC network thereby senses the transition of the current from the peak portion to the settling portion, and activates the switch coupling the low impedance branch. Besides employing a minimum number of components, the use of a high impedance RC network for sensing allows detection of the peak in the current, via the voltage waveform, substantially without affecting the current in the head as driven by the write amplifier.

In a practical embodiment, the device includes a second such damping network coupled in mirror arrangement with the first, so that the peak of the current is detected and damped for current in both directions of the head.

In a favorable embodiment, the damping network is programmable to allow optimal tuning in dependence on the particular head and to allow for chip-to-chip variations. The damping network may be programmed via a serial interface, for example.

The invention also relates to a method of writing to a magnetic medium, as well as to an integrated circuit which includes a write amplifier and a damping network.

These and other object, features and advantages of the invention will become apparent with reference to the following detailed description and the drawings.

DETAILED DESCRIPTION OF THE PREFERRED EMBODIMENTS

Figure 1:
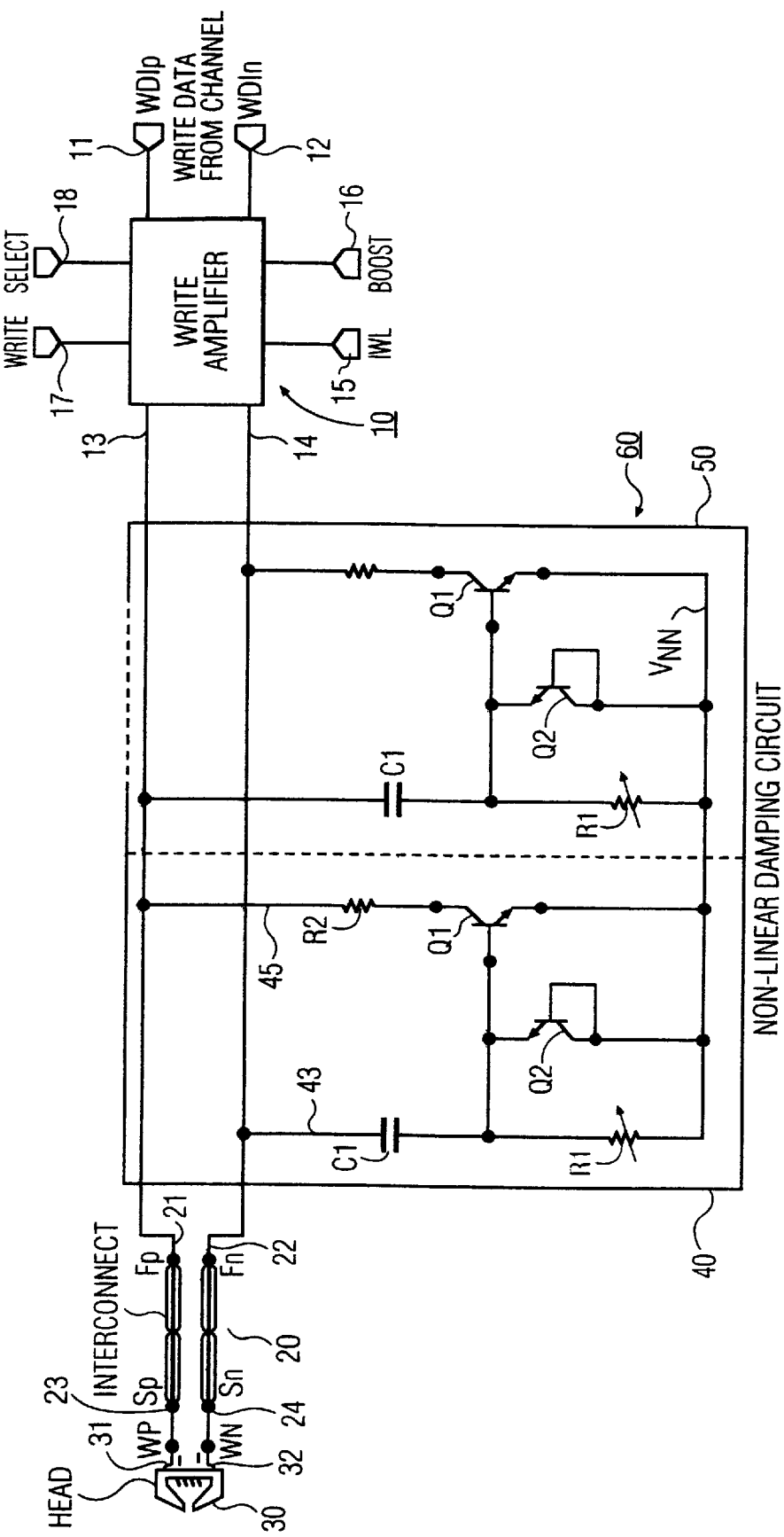
FIG. 1 illustrates a write channel according to the invention which includes a damping network.

FIG. 1 shows a write channel for a magnetic recording device according to the invention. A hard disk drive includes write amplifier 10 having first and second input terminals 11, 12 for receiving information to be written to the magnetic medium. The information is provided by pre-processing circuitry in the device, in a conventional manner. The amplifier 10 includes first and second outputs 13, 14 coupled to an inductive head 30 via an interconnect circuit 20. The interconnect circuit 20 is conventional and is modelled by inductive and capacitive elements arising from and depending on the physical properties of the interconnect, such as length, material used, and spacing. The outputs 13, 14 are coupled to respective inputs 21, 22 of the interconnect circuit. The interconnect circuit, in turn, has outputs 23, 24 coupled to respective terminals 31, 32 of the inductive head 30.

Figure 2:
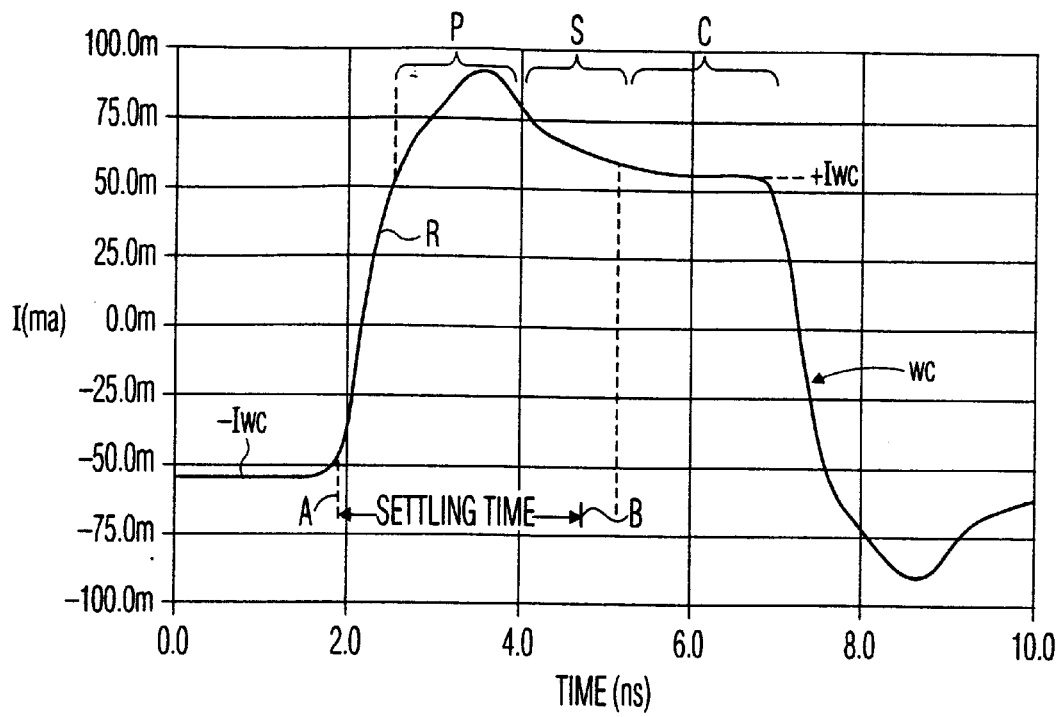
FIG. 2 is a graph showing a current waveform for a conventional write channel without the damping network.

The amplifier circuit also includes a multi-bit control input 15 (IWC) which controls the value of the settled current level Iwc in the head (illustrated in FIG. 2). A boost control input 16 (BOOST), which also can be multi-bit, controls the level of overshoot of the current waveform beyond the level Iwc. Input 17 receives a write control signal (WRITE) which turns the amplifier ON and OFF. Input 18 receives a head select signal (SELECT) which controls the coupling of the outputs 13, 14 to a selected head in a multi-head system. The above functions and supporting circuitry are conventional, and not being necessary for an understanding of the invention, are not further described for purposes of clarity.

When a binary value is to be written to the magnetic medium, the amplifier drives a current through the head 30 in a first direction to write a first binary value, and in the opposite direction to write the opposite binary value. FIG. 2 shows a write current "WC" from a conventional write amplifier, and corresponding to the writing of one bit of information to a magnetic medium. The y-axis is current in mA and the x-axis is time in ns. The write current has a rising portion ("R"), a peak portion ("P") which begins at a current level Iwc, a settling portion ("S") and a settled portion ("C").

For hard disk drives (HDD) which will soon become commercially available, data rates on the order of 500–600 Mb/s are desirable, which implies a bit duration of less than 2 ns. At this data rate, settling times of less than 1.5 ns are required. In the current waveform shown in FIG. 2, the current transition is from −Iwc to +Iwc. Iwc is programmable via input 15 of write amplifier 10, and typical maximum values for commercially available write amplifiers are on the order of 50–65 mA. A "settling time" is defined as the time required to go from within 20% of −Iwc, denoted by the current level at dashed line "A" to a settling of within 20% of +Iwc, denoted by the current level at dashed line "B". In FIG. 2, the 20% points are about −44 mA and +66 mA. The settling time is the elapsed time along the x-axis between the dashed lines "A" and "B". Typical settling times for present day write amplifiers is on the order of 2.5 ns to 3.5 ns.

In order to reduce bit duration, thereby increasing data rates, the present invention provides a damping network which reduces the length of the settling portion S of the current waveform without adversely affecting the rise time of the current waveform portion R. As mentioned earlier, short rise times are achieved with strong current overshoot, and are desirable as it reduces bit duration. Current overshoot is also important for generating a strong flux by the write head. Thus, as shown in FIG. 2, it is desirable to have a steep rising portion R as well as a strong overshoot, which is the part of portion R of the current waveform extending above Iwc (55 mA in FIG. 2). However, the strong current causes an undesirably long settling portion S, and consequently an undesirably long settling time. As is evident from FIG. 2, reducing the length of the settling portion S while maintaining the steep slope of the rising portion will reduce the settling time. It should be noted that FIG. 2, and FIGS. 3–4 still to be discussed, use a current waveform for a data rate of only 200 Mb/s, so as to best illustrate the principles of the invention.

To this end, the non-linear damping circuit 60 (FIG. 1) includes first and second damping networks 40, 50. The damping network 40 serves to reduce settling time for the current in one direction, while the damping network 50 serves to reduce the settling time when the current is driven by the write amplifier in the opposite direction to write the opposite binary value.

Damping network 40 includes a high impedance circuit branch 43 coupled to the second terminal 32 of inductive head 30 via the input terminal 22 of the of the interconnect circuit 20. The branch 43 includes a sense resistor R1 and a sense capacitor C1 coupled in series to each other between the terminal 22 and a low supply terminal $V_{NN}$, such as a negative supply terminal −Vcc. Network 40 also includes a low impedance branch 45 coupled to the other head terminal 31 via interconnect input terminal 21, the low impedance branch 45 including a damping resistor R2 coupled in series with the main current path of a switch Q1. In this example, the switch Q1 is a bipolar transistor having a collector coupled to the resistor R2, a base coupled to a junction between the resistor R1 and the capacitor C1, and an emitter coupled to the supply terminal $V_{NN}$.

The damping network 50 is identical to the network 40, but is coupled to the terminals of the head 30 in the opposite sense to that of the network 40 for the reasons already noted. Components in network 50 bear the same reference legends as those in network 40. The operation of the circuit will be discussed with reference to network 40.

The RC network formed by the resistor R1 and the capacitor C1 serves to control the switching of the switch Q1 in correct time relation to the current waveform. The RC network accomplishes this by differentiating the waveform of the voltage across the head 30 driven by the write amplifier. When the differentiated voltage reaches one diode drop above $V_{NN}$, the switch Q1 turns on, i.e., becomes conductive. The RC network has a very high impedance, substantially higher than the low impedance branch, selected so as to substantially not effect the current in the head. The switch Q1 is normally open. When the switch Q1 becomes conductive, the terminal 31 of the head 30 is coupled to the supply $V_{NN}$ via the damping resistor R2 and the main current path of switch Q1, thereby diverting current from the head.

The timing of the network 40 is illustrated with reference to FIG. 3. The solid line WC represents the write current as in FIG. 2. The solid line V is the voltage at the terminal 32 of head 30. The dashed line labeled CR is the current through the damping resistor R2. In the case of a write amplifier implemented as a voltage driver, the write amplifier drives current though the head by increasing the voltage applied to the head. The RC network senses the voltage at node 32, and effectively differentiates this voltage. After the negative peak Pv1 of the voltage waveform V, which is after the current has reached the peak portion, the voltage begins to rise as does the voltage at the base of the transistor Q1. At about the midpoint of the rising portion V, (i.e., above Iwc), the voltage at the base of transistor Q1, i.e., the differentiated voltage rises enough to render the transistor Q1 conductive. The differentiated voltage applied to the base of switch Q1 is labelled $Q1_b$, while the turn-on voltage is labeled $Q1V_{be}$ (one Vbe above $V_{NN}$). At this point, where curve $Q_{1b}$ crosses curve $Q1V_{be}$ Q1 turns on and current begins to flow through the damping resistor R2, at the point CR1 on the curve CR. In essence, when the transistor Q1 is turned on, the current that is normally forced through the head by the write amplifier is diverted through the damping resistor, allowing the current level to fall more rapidly. As current is diverted through the damping resistor, the voltage V reaches a positive peak Pv2 and falls again. The differentiating effect of the voltage V by the RC network R1, C1 will cause the voltage at the base of switch Q1 to fall sufficiently to turn switch Q1 off again, at the point CR2.

Figure 4:
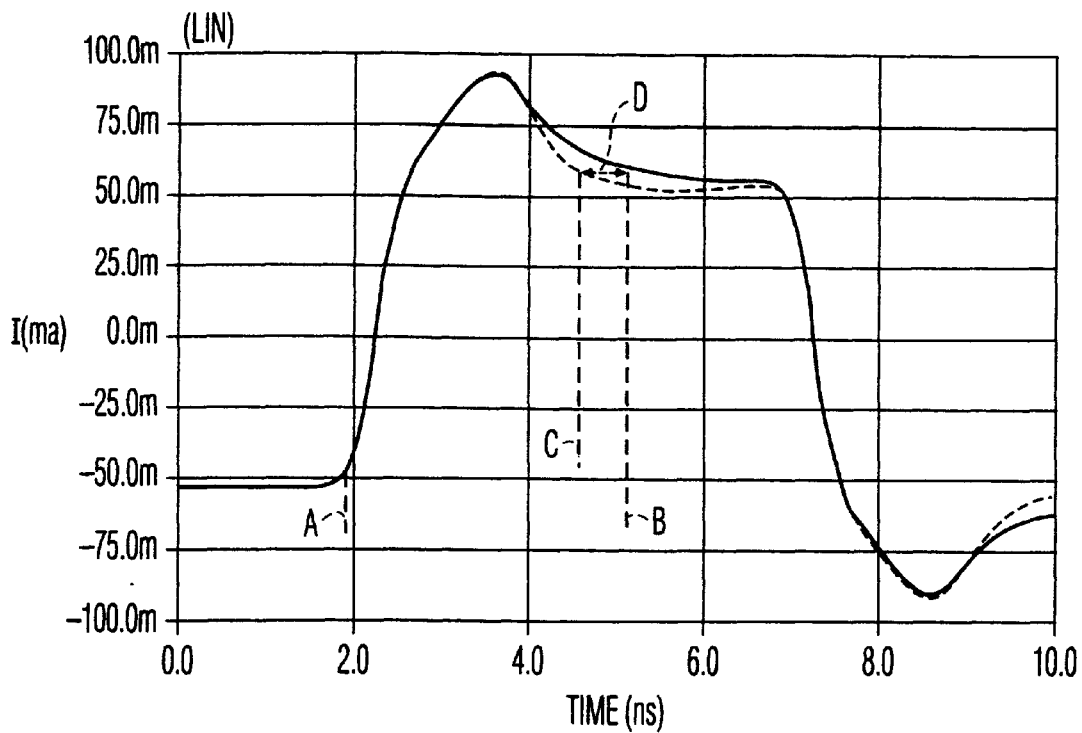
FIG. 4 is a graph comparing a current waveform from the write channel according to the invention with a current waveform from the conventional write channel and illustrating the reduced settling time.

FIG. 4 illustrates the reduction in settling time resulting from the damping network 40. The solid line is the current waveform in the head occurring without the damping network and the dashed line is the current waveform obtained with the damping network. The end of the settling time for the waveform with the damping network is denoted by the vertical line C and that for the waveform without the damping network is labeled B. The reduction in the settling time is the duration between these two vertical lines, in this case about 0.75 ns, indicated by the dashed double arrow D.

Figure 3:
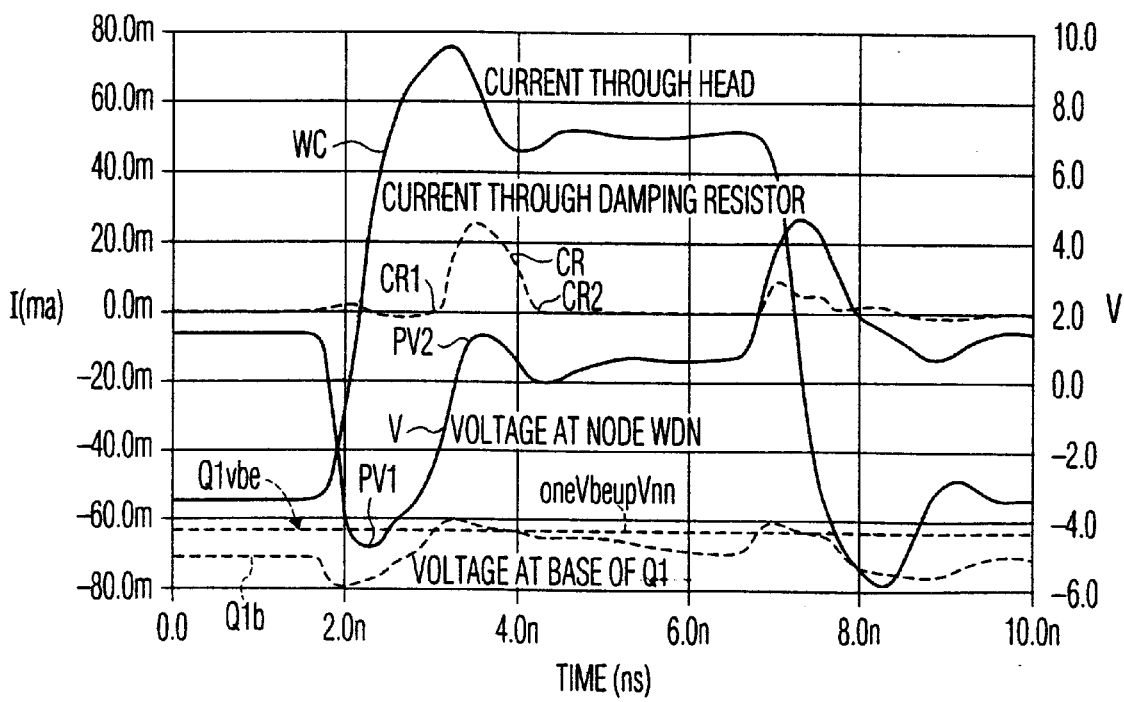
FIG. 3 is a graph showing a current waveform, voltage waveform and damping resistor current with the damping network according to the invention.

It is noted that a current waveform to write the opposite bit of information to that written in FIGS. 2–4 will be the inverse of that shown in these Figures. Accordingly, "rise time" and "rising portion" as used herein also refer to the corresponding portion of the negative waveform, even though increasing in the negative direction towards a negative peak, instead of in the positive direction towards a positive peak. Also, the reader will note that current waveform WC differs slightly between FIGS. 3, and FIGS. 2 and 4 due to different component values for the RC network. The Figures thus illustrate the principle of reducing the settling times, and not an optimal settling time.

In FIG. 1, the sense resistors R1 of networks 40 and 50 are shown as being programmable. The sense capacitors may also be programmable. Programmable resistors and capacitors in integrated circuits are conventional, and well known by those in the art. A programmable capacitor may be implemented, for example, with several parallel capacitors each having a switch in series therewith. By controlling the switches, for example, by a logic circuit, the capacitance of the parallel network changes as capacitors are switched in and out of the circuit. Programmable resistors are implemented in a similar fashion. As opposed to an RC network with a fixed value, a programmable RC network will permit the timing of switch Q1 to be adjusted for different combinations of Iwc and overshoot as may be programmed by a user through the IWC and BOOST controls of the write amplifier 30. Programming the damping network can be of significant advantage from the suitability of tuning the damping circuit for best response for a given preamplifier and head system thereby eliminating process variation (chip-to-chip variation of the preamplifier IC or head-to-head variation) and obtaining best (minimum) Bit Error Rates for the disk drive system.

Figure 5:
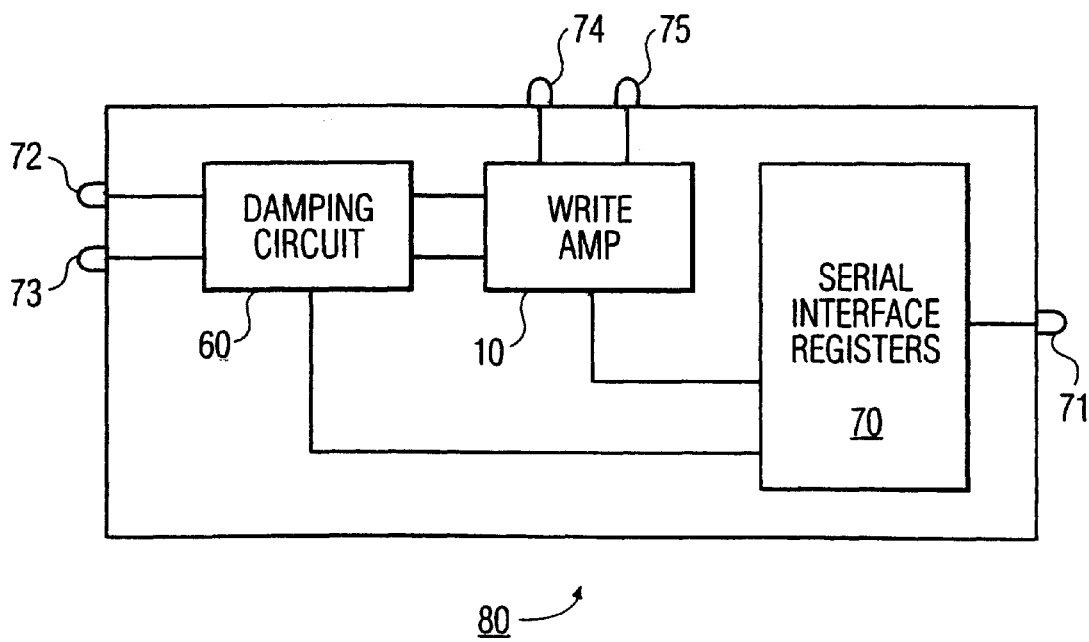
FIG. 5 is a diagram illustrating an integrated circuit with a serial interface for programming the damping network and write amplifier.

Typically, the write amplifier and damping network will be combined on an integrated circuit. FIG. 5 diagrammatically illustrates an integrated circuit 80 which includes the damping circuit 60 and write amplifier 10 of FIG. 1. Additionally, the integrated circuit includes a plurality of serial interface registers 70. The serial interface registers are loaded via a connection pin 71 and coupled to the damping circuit 60 and write amplifier 10. In this way, control data is entered to the integrated circuit to program the control inputs 15–18 of the write amplifier 10 as well as to program the programmable capacitors and resistors of the damping circuit 60. Coupling of the damping network to the head and the sensing of the voltage across the head will then be accomplished via connection pins 72, 73 of the integrated circuit 80, which would be coupled to the head via an interconnect circuit. Information to be written to a magnetic medium is provided to amplifier 10, for example, by connection pins 74, 75.

The process or technology by which the invention is made is not important, and any of the standard bipolar or CMOS processes can be used.

Although preferred embodiments of the present invention have been shown and described with respect to a hard disk drive, the present invention is applicable to many forms of magnetic recording devices. It will be appreciated by those skilled in the art that changes may be made in these embodiments without departing from the principles and spirit of the invention, the scope of which is defined in the claims. The many features and advantages of the invention are apparent from the detailed specification and it is intended by the appended claims to cover all such features and advantages which fall within the true spirit and scope of the invention. Since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A device for writing information to a magnetic medium, said device comprising:

an inductive head having a first terminal and a second terminal;

a write amplifier coupled to the inductive head, said write amplifier receiving an information signal corresponding to said information, amplifying said information signal, and driving a current, corresponding to the amplified information signal, through the inductive head to generate a magnetic flux at the inductive head, said magnetic flux writing a bit of the information on the magnetic medium, the current corresponding to each bit of the information having a rising portion, a peak portion, and a settling portion;

a damping network coupled to the inductive head; and a further damping network also coupled to the inductive head, wherein the damping network comprises:

a low impedance branch having a first resistive element;

means for detecting the current through the inductive head, said detecting means sensing a voltage across the inductive head, said detecting means comprising a high impedance branch having a second resistive element and a capacitive element coupled to said first terminal of said inductive head; and means for coupling the low impedance branch to the inductive head and the write amplifier after said detecting means detects that the current has reached the peak portion, said coupling means comprising a switch connected in series with said first resistive element for coupling the low impedance branch to the second terminal of the inductive head, said switch having a control electrode coupled to a node between the second resistive element and the capacitive element of the high impedance branch such that said switch is rendered conductive in response to the voltage across said inductive head, whereby said low impedance branch diverts current from the inductive head for reducing a duration of the settling portion of the current, and wherein the further damping network comprises:
   a high impedance branch coupled to said second terminal of said inductive head; and
   a low impedance branch coupled to said first terminal of said inductive head.

2. The device as claimed in claim 1, wherein at least one of said first and second resistive elements and said capacitive elements is programmable.

3. The device as claimed in claim 2, wherein said device further comprises a serial interface for programming said at least one of said first and second resistive elements and said capacitive elements.

4. The device as claimed in claim 1, wherein said detecting means comprises a high impedance branch coupled to said inductive head, said low impedance branch having a substantially lower impedance than said high impedance branch, and said coupling means comprises a switch for selectively coupling the low impedance branch to the inductive head, the damping network controlling said switch to couple the low impedance branch to the head upon said detecting means sensing the peak portion of the current.

5. The device as claimed in claim 1, wherein said device is a hard disk drive.

6. An integrated circuit comprising:
   connection pins for coupling the integrated circuit to an inductive head external to the integrated circuit;
   an amplifier for generating a current for driving the inductive head to write information to a magnetic medium, the current including a rising portion, a peak portion, and a settling portion; and
   a damping network coupled to said connection pins, and a further damping network also coupled to said connection pins, wherein said damping network comprises:
      a low impedance path having a first resistive element;
      means for detecting the peak portion of the current coupled to one of said connection pins, said detecting means sensing a voltage across said connection pins, said detecting means comprising a high impedance path having a second resistive element and a capacitive element coupled to said one of said connection pins; and
      means for coupling the low impedance path to another of said connection pins in response to said detecting means detecting that the current reaches the peak portion, said coupling means comprising a switch connected in series with said first resistive element for coupling the low impedance branch to said another of said connection pins, said switch having a control electrode coupled to a node between the second resistive element and the capacitive element of the high impedance path such that said switch is rendered conductive in response to the voltage across said connection pins, whereby the low impedance path diverts current from the connection pin and as a result from the inductive head connected to the connection pins for reducing a duration of the settling portion of the current, and wherein the further damping network comprises:
      a high impedance path coupled to said another of said connection pins; and
      a low impedance path coupled to said one of said connection pins.

7. The integrated circuit as claimed in claim 6, wherein said detecting means differentiates a voltage at the connection pins corresponding to a voltage across the inductive head.

8. The integrated circuit as claimed in claim 6, wherein at least one of said amplifier and said damping network are programmable, and wherein said integrated circuit further comprises serial interface registers for receiving control data to program said at least one of said amplifier and said damping network.

* * * * *

Disclaimer

6,307,695 B1 — Sanjay Manohar Bhandari, Santa Clara, CA (US). MAGNETIC DISK WRITE CHANNEL WITH DAMPING NETWORK. Patent dated October 23, 2001. Disclaimer filed March 28, 2008, by the assignee, Philips Electronics North America Corporation.

Hereby enters this disclaimer to all claims of said patent.

*(Official Gazette, April 7, 2009)*